US012034618B2

(12) United States Patent
Nandi et al.

(10) Patent No.: US 12,034,618 B2
(45) Date of Patent: Jul. 9, 2024

(54) IPV6 CONNECTIVITY TEST AND DNS IMPROVEMENTS

(71) Applicant: ROKU, INC., San Jose, CA (US)

(72) Inventors: Sudipto Nandi, San Jose, CA (US); Amalavoyal Narasimha Chari, San Jose, CA (US); Jason Schmidlapp, San Jose, CA (US); Tito Thomas, San Jose, CA (US); Allen Wong, San Jose, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 17/940,673

(22) Filed: Sep. 8, 2022

(65) Prior Publication Data

US 2024/0089186 A1   Mar. 14, 2024

(51) Int. Cl.
*H04L 43/0811* (2022.01)
*H04L 61/103* (2022.01)
*H04L 61/4511* (2022.01)
*H04L 61/50* (2022.01)

(52) U.S. Cl.
CPC ........ *H04L 43/0811* (2013.01); *H04L 61/103* (2013.01); *H04L 61/4511* (2022.05); *H04L 61/50* (2022.05)

(58) Field of Classification Search
None
See application file for complete search history.

(56) References Cited

U.S. PATENT DOCUMENTS

| 7,415,536 B2 * | 8/2008 | Nakazawa | H04L 61/4511 707/999.005 |
| 7,657,642 B2 | 2/2010 | Blanchet | |
| 2010/0128612 A1 * | 5/2010 | Qian | H04L 43/0817 370/250 |
| 2010/0217890 A1 * | 8/2010 | Nice | H04L 69/167 709/230 |
| 2011/0286470 A1 | 11/2011 | Dec et al. | |
| 2011/0289185 A1 * | 11/2011 | Heder | H04L 69/167 709/217 |
| 2016/0191643 A1 | 6/2016 | Lyon | |
| 2017/0244667 A1 | 8/2017 | Maslak | |
| 2018/0091627 A1 | 3/2018 | Perez | |

FOREIGN PATENT DOCUMENTS

| CN | 109462668 B | * 11/2020 | .......... H04L 61/1511 |
| CN | 112165538 A | * 1/2021 | .......... H04L 43/0811 |
| JP | 2004350133 A | * 12/2004 | |
| JP | 5231513 B2 | * 7/2013 | |
| WO | WO-2011160587 A1 | * 12/2011 | ....... H04L 29/12066 |

OTHER PUBLICATIONS

International Search Report for Application No. PCT/US2023/073612, dated Dec. 27, 2023, 8 pages.

* cited by examiner

*Primary Examiner* — Younes Naji
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for optimizing network connections of media devices using IPv6 and DNS tests to detect network issues related to IPv6 addressing and improper DNS server assignments. Upon detection of such network issues, network connections may preemptively adjust IPv6 and DNS configuration parameters to optimize connections for the media devices.

18 Claims, 5 Drawing Sheets

IPV6 CONNECTIVITY TEST AND DNS IMPROVEMENTS

BACKGROUND

Field

This disclosure is generally directed to improving connectivity between devices where the connections between the devices involve at least one of IPv6 addresses and DNS servers.

Background

Adoption of Internet Protocol version 6 or IPv6 has steadily increased since its introduction in 2012. Every device connected to the Internet requires an IP address to be identified and connected to other devices. An older version of the IP protocol, IPv4, utilizes 32-bit addresses and has a limitation of $2^{32}$ unique addresses. In contrast, IPv6 utilizes 128-bit addresses and has a limitation of $2^{128}$ unique addresses. Because support for IPv6 addressing is not consistent across internet service providers, network devices typically support both IPv6 and IPv4 addresses. But network devices can face challenges when implementing both addressing schemes such as how to determine when to use IPv6 or IPv4 addresses when establishing connections, and how to handle interoperability issues with various internet service providers, some of which may support IPv6 and some of which may not.

Current network devices that support both IPv6 and IPv4 addresses lack the capability to preemptively detect potential connectivity issues with deploying IPv6 addresses when connecting to networks that may or may not support IPv6. This deficiency results in poor network streaming experiences while the user waits for the network devices attempt to resolve connectivity issues. Therefore, what is needed is an improved network address allocation scheme for utilizing IPv6 and IPv4 addresses in network devices.

SUMMARY

Provided herein are system, apparatus, article of manufacture, method and/or computer program product embodiments, and/or combinations and sub-combinations thereof, for preemptively performing internet connectivity tests including an IPv6 address check and DNS resolver test to ensure reliable establishment of network connections for streaming content at a media device. The operations of displaying splash screens (static or dynamic) while compiling or otherwise initiating the compilation of code for the application to be launched may be considered part of a launch sequence for that application. The launch sequence may be initiated at the media device and may occur prior to the application being loaded and having control over the media device.

An example embodiment operates by initiating an IPv6 address test on a media device comprising an IPv6 network stack and an IPv4 network stack. The IPv6 address test may be triggered when the media device detects an action involving an IPv6 address being performed on a network interface of the media device. For example, the action may include assigning a new IPv6 address to the network interface. In performing the IPv6 address test, the media device initiates a network interface monitor that identifies a set of IPv6 addresses assigned to the network interface. As part of the IPv6 address test, the network interface monitor may perform an IPv6 address resolution test by attempting to resolve a predetermined website stored in a memory of the media device for each IPv6 address in the set of IPv6 addresses. For each IPv6 address, the network interface monitor may receive a result of the IPv6 address resolution test indicating either a successful result (e.g., the network interface monitor was able to resolve the predetermined website using the IPv6 address) or a failed result (e.g., the network interface monitor was not able to resolve the predetermined website).

The network interface monitor may then perform certain actions based on the result of the IPv6 address resolution test for each IPv6 address. For example, if there is a failed result, the network interface monitor may disable the IPv6 network stack of the network interface. The media device may then stream data using the network interface over the IPv4 network stack while the IPv6 network stack is disabled. As another example, if there is a successful result, the network interface monitor may perform a connectivity test to the predetermined website (e.g., attempt to access a web page at the predetermined website). The media device may then stream data using the network interface over either the IPv6 network stack or the IPv4 network stack based on the result of the connectivity test.

Another example embodiment operates by initiating a DNS resolver test on a media device. The DNS resolver test preemptively tests DNS server addresses based on certain trigger conditions such as changes to IPv4 addresses, changes to DNS server addresses, and changes to IPv6 addresses. The DNS resolver test may determine, based on a configurable predetermined time period for responses, whether DNS server addresses are reliable and can be used for subsequent communications for the media device.

While described in the context of media devices, this disclosure is not so limited. Instead, this disclosure is applicable to any system, apparatus, device, method, computer program product where it is desirable to optimize network communications involving IPv6 and DNS server configuration parameters.

BRIEF DESCRIPTION OF THE FIGURES

The accompanying drawings are incorporated herein and form a part of the specification.

In the drawings, reference numbers indicate identical or similar elements. Additionally the left-most digit(s) of a reference number identifies the drawing in which the reference number first appears.

DETAILED DESCRIPTION

Figure 1:
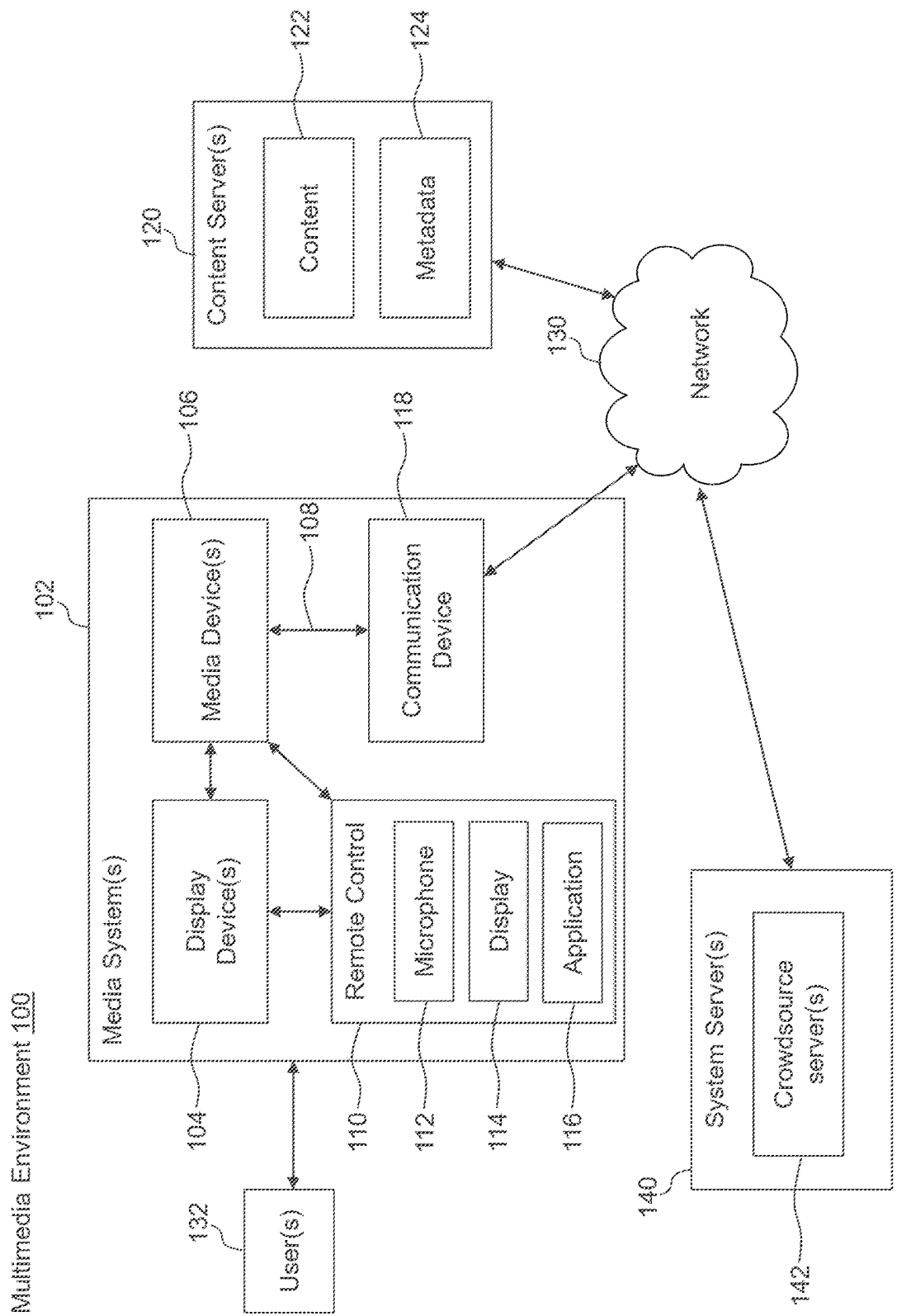
FIG. 1 illustrates a block diagram of a multimedia environment, according to some embodiments.

Provided herein are system, apparatus, device, method and/or computer program product embodiments, and/or combinations and sub-combinations thereof, for the improved functioning of network devices, such as media devices, to utilize IPv6 network addresses. When deployed, network devices may connect to a network, such as but not limited to a home Wi-Fi network, and be provided with one or more IPv6 endpoint addresses and one or more IPv4 endpoint addresses from the internet service provider (ISP) servicing that home Wi-Fi network, as well as IPv6 DNS server addresses which may be stored in a private memory location of the media device. The network devices may be configured with an IPv6 network stack and an IPv4 network stack and therefore capable of utilizing both IPv6 and IPv4 addresses. The improved functioning includes preemptively performing network connectivity tests. One example of a network connectivity test is a DNS resolver test to test new DNS server addresses that are assigned to the media device and/or the DNS server addresses that are stored in the private memory location of the media device. Another example is to transmit data using the IPv6 network stack based on the IPv6 endpoint addresses that have been assigned to the network interface of the media device. Yet another example of a network connectivity test is the use of parallel DNS queries to DNS servers located within the private memory location of the media device. The media device may send the DNS queries at the same time. Responses from DNS servers indicate that the DNS servers are responsive and usable by media device.

The performance of the IPv6 connectivity tests may be triggered by specific actions performed on the network interface such as the assignment or removal of an IPv6 endpoint address from the network interface of the media device. Another network connectivity test may include testing DNS server addresses provisioned to a media device, such as via a DNS server test or via parallel DNS queries, and preemptively selecting and/or ranking DNS server addresses for use by the media device. In some embodiments, preemptively performing these tests means performing the tests prior to the media device submitting a request for streaming content over the network connection. Implementing these connectivity tests in a media device improves the functioning of the media device because the media device may more quickly establish IPv6 network connections which results in an improved streaming experience.

In some embodiments, the IPv6 address test may be comprised of multiple sub-tests that are performed sequentially or in parallel based on the results of a prior test. For example, the IPv6 test may include sub-tests for resolving a predetermined network address using IPv6 DNS server addresses stored in a private location of the media device, for downloading a webpage from the predetermined network address, for opening IPv6 streaming sockets of the network interface of the media device, and for attempting to connect to a second predetermined network address using the IPv6 network stack of the media device.

In some embodiments, these sub-tests may be performed in a sequential manner and be based on the results of the previous sub-test. For example, the media device may be programmed to initiate communications over the IPv6 network stack upon a successful result of any one of the sub-tests of the IPv6 address test and to initiate communications over the IPv4 network stack (e.g., by disabling the IPv6 network stack) upon a failed result of any or all of the sub-tests of the IPv6 address test.

In some embodiments, the DNS resolver test may test both IPv4 and IPv6 DNS server addresses and may be triggered based on certain conditions at the media device such as changes to IPv4 addresses, changes to DNS server addresses, and changes to an IPv6 addresses.

In some embodiments, the DNS resolver test may include initiating parallel DNS queries. In such embodiments, applications on the media device may use a background process to initiate queries to the DNS servers that are located in the private memory location of the memory device. As part of this process, the background process may poll a separate DNS server file that is located upstream in the network from the media device to retrieve additional DNS servers available to the media device. The media device may form the DNS query or queries based on the information stored in the private memory location and transmit the DNS query or queries to the background process. The background process will then check a cache, which stores prior DNS responses to prior DNS queries, to see if a prior DNS response has been received from any of the DNS servers identified in the received DNS queries. If no such DNS responses are in the cache, then the background process will send parallel queries to all DNS servers (identified by their server IP addresses) and cache any responses received to the parallel queries. In some embodiments, parallel DNS queries and caching functionality described herein is performed for all DNS queries initiated by the media device, and not just part of the DNS resolver test.

Various embodiments of this disclosure are particularly advantageous for media devices that are configured with both an IPv6 and IPv4 network stack because the media device may preemptively determine which network stack to use prior to streaming content. This determination may include preemptively testing network configuration parameters such as IPv6 endpoint addresses assigned to the media device and DNS server addresses (both IPv4 and IPv6 addresses), such as via parallel DNS queries. Accordingly, the media device may determine which network configurations to use when subsequently submitting requests to stream content. Embodiments of this disclosure provide improvements for more effectively establishing reliable connections for streaming content to media devices.

Various embodiments of this disclosure may be implemented using and/or may be part of a multimedia environment 100 shown in FIG. 1, in some embodiments. It is noted, however, that multimedia environment 100 is provided solely for illustrative purposes and is not limiting. Embodiments of this disclosure may be implemented using and/or may be part of environments different from and/or in addition to the multimedia environment 100, as will be appreciated by persons skilled in the relevant art(s) based on the teachings contained herein. An example of the multimedia environment 100 shall now be described.

Multimedia Environment

FIG. 1 illustrates a block diagram of a multimedia environment 100, according to some embodiments. In a non-limiting example, multimedia environment 100 may be directed to streaming media across a network, such as from a server (e.g., content server 120) to a media system (e.g., media system 102). However, this disclosure is applicable to any type of media (instead of or in addition to streaming media), as well as any mechanism, means, protocol, method and/or process for distributing media.

The multimedia environment 100 may include one or more media systems 102. A media system 102 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 102 to select and consume content. For example, user(s) 132 may interact with remote control 110 via a graphical user interface on the remote control 110, physical inputs on the remote control 110, or microphone 112, to select content for streaming.

Each media system 102 may include one or more media device(s) 106 each coupled to one or more display devices 104. It is noted that terms such as "coupled," "connected to," "attached," "linked," "combined" and similar terms may refer to physical, electrical, magnetic, logical, etc., connections, unless otherwise specified herein.

Media device 106 may be a device that relays media content such as a streaming media device, a set-top box, DVD or BLU-RAY device, audio/video playback device, cable box, and/or digital video recording device, to name just a few examples. In some embodiments, media device 106 may be implemented with network interface, such as communication device 118, having an IPv6 network stack and an IPv4 network stack; media device 106 may therefore be capable of relaying media content using IPv6 and IPv4 addresses. A dedicated media processor may be implemented as a processor that is optimized for streaming media content from one source and providing it for display via a graphical user interface on display device 104. In some embodiments, a processor that is optimized for streaming media content may be a processor that is configured to perform a limited number of tasks associated only with streaming and presenting media content. As an example, a media processor may not be capable of processing tasks associated with a phone call. Accordingly, in some embodiments, media device 106 may be implemented as media device with a dedicated media processor that is limited to performing tasks associated with streaming media content.

Display device 104 may be a monitor, television (TV), computer, smart phone, tablet, wearable device (such as a watch or glasses), appliance, internet of things (IoT) device, and/or projector, to name just a few examples. In some embodiments, media device 106 can be a part of, integrated with, operatively coupled to, and/or connected to display device 104.

Each media device 106 may be configured to communicate with network 130 via the IPv6 network stack or IPv4 network stack of communication device 118. The communication device 118 may include network interfaces such as, for example, a cable modem or satellite TV transceiver. The media device 106 may communicate with the communication device 118 over a link 108, wherein the link 108 may include wireless (such as Wi-Fi) and/or wired connections.

In various embodiments, the network 130 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 102 may include a remote control 110. The remote control 110 can be any component, part, apparatus and/or method for controlling the media device 106 and/or display device 104, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 104 using cellular, Bluetooth, infrared, etc., or any combination thereof. The remote control 110 may include a microphone 112, which is further described below. The remote control 110 may further include a display 114 for displaying a graphical user interface that enables user selection of content to be provided by media device(s) 106. In an embodiment, the graphical user interface is provided by a remote control application 116 installed in remote control 110. Display 114 may be of various size depending on the remote control 110.

The remote control application 116 may be installed on remote control 110 and may be configured to display a user interface for accessing content via media device(s) 106. The user interface may provide any means for allowing user(s) 132 to view, select, and otherwise identify content to be streamed by media device(s) 106. The user interface may include a predefined dimension (e.g., to fit the size of display 114) and predefined configuration that implements particular user interface elements at specific positions in the user interface. For example, the predefined configuration may implement a particular layout for a direction pad, volume controls, and other user interface elements for interacting with media content. The application may further include means for implementing an interface customization parameter that modifies the predefined dimension and/or the predefined configuration by, for example, either reducing the dimension to a smaller size or modifying the layout so that different user interface elements are displayed at different positions of the user interface.

In an embodiment, the remote control application 116 may also include means for monitoring local usage information by user(s) 132. For example, the remote control application 116 may track how often certain user interface elements are utilized and may store this history in memory. These user interface elements include a direction pad and buttons for controlling the media content. In an embodiment, the usage information may be implemented as a ranked list identifying how often certain interface elements are used by user(s) 132. For example, the usage information may indicate that user(s) 132 utilizes the volume buttons—volume up, volume down, mute—more than other interface elements. The application may transmit the usage information to crowdsource server(s) 142.

Buttons may allow users to control playback of media content and provide access to other tools such as user settings, network settings. Another example a user interface element is a slider which may provide more granular control over playback (e.g., rewind or fast forward) or settings (e.g., adjusting volume, brightness, etc.)

The multimedia environment 100 may include a plurality of content servers 120 (also called content providers or sources). Although only one content server 120 is shown in FIG. 1, in practice the multimedia environment 100 may include any number of content servers 120. Each content server 120 may be configured to communicate with network 130.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, applications, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 100 may include one or more system servers 140. The system servers 140 may operate to support the media device(s) 106 from the cloud. It is noted that the structural and functional aspects of the system servers 140 may wholly or partially exist in the same or different ones of the system servers 140.

The media device(s) 106 may exist in thousands or millions of media systems 102. Accordingly, the media device(s) 106 may lend themselves to crowdsourcing embodiments and, thus, the system servers 140 may include one or more crowdsource servers 142. Media device(s) 106 may be implemented as one or more different types of devices, such as a streaming stick, a set-top box, and a media streaming device integrated into another media device such as a television or a sound bar.

For example, using information received from the media device(s) 106 in the thousands and millions of media systems 102, the crowdsource server(s) 142 may identify similarities and overlaps between closed captioning requests issued by different users 132 watching a particular movie. Based on such information, the crowdsource server(s) 142 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 142 may operate to cause closed captioning to be automatically turned on and/or off during future streaming of the movie.

Crowdsource server(s) 142 may further store user interface usage information such as how user(s) 132 interact with the user interface provided through their respective remote control 110 including the usage information described above. Crowdsource server(s) 142 may generate crowdsource user interface information that may identify usage history of the user interface for all remote controls that are connected to crowdsource server(s) 142. The crowdsource user interface information may be implemented as a ranked list identifying user interface elements that are most used by a plurality of users across multiple multimedia environments.

Crowdsource server(s) 142 may further store network connection information such as results of IPv6 connectivity and DNS resolver tests performed by media device(s) 106. In some embodiments, media device(s) 106 may be configured to transmit the results of one or more tests to crowdsource server(s) which may then aggregate and organize the network connection information based on parameters associated with the results, such as the type of media device(s) 106, the type of network connection (e.g., IPv6, IPv4), and applications installed on the media device including network usage of each of the applications. Crowdsource server(s) 142 may provide this aggregated and organized network connection information to system server(s) 140 which may generate system updates for media device(s) 106 to improve network performance. For example, the system updates may be generated based on determining that certain types of media device(s) 106 (e.g., a streaming stick) are having more failed results attempting to connect using IPv6 addresses and the system update may be pushed to those media devices in order to improve the network performance of those media devices. System updates may update network configuration parameters at each media device(s) 106 such as predetermined time periods to wait for responses from the DNS servers of a DNS resolver test.

Figure 2:
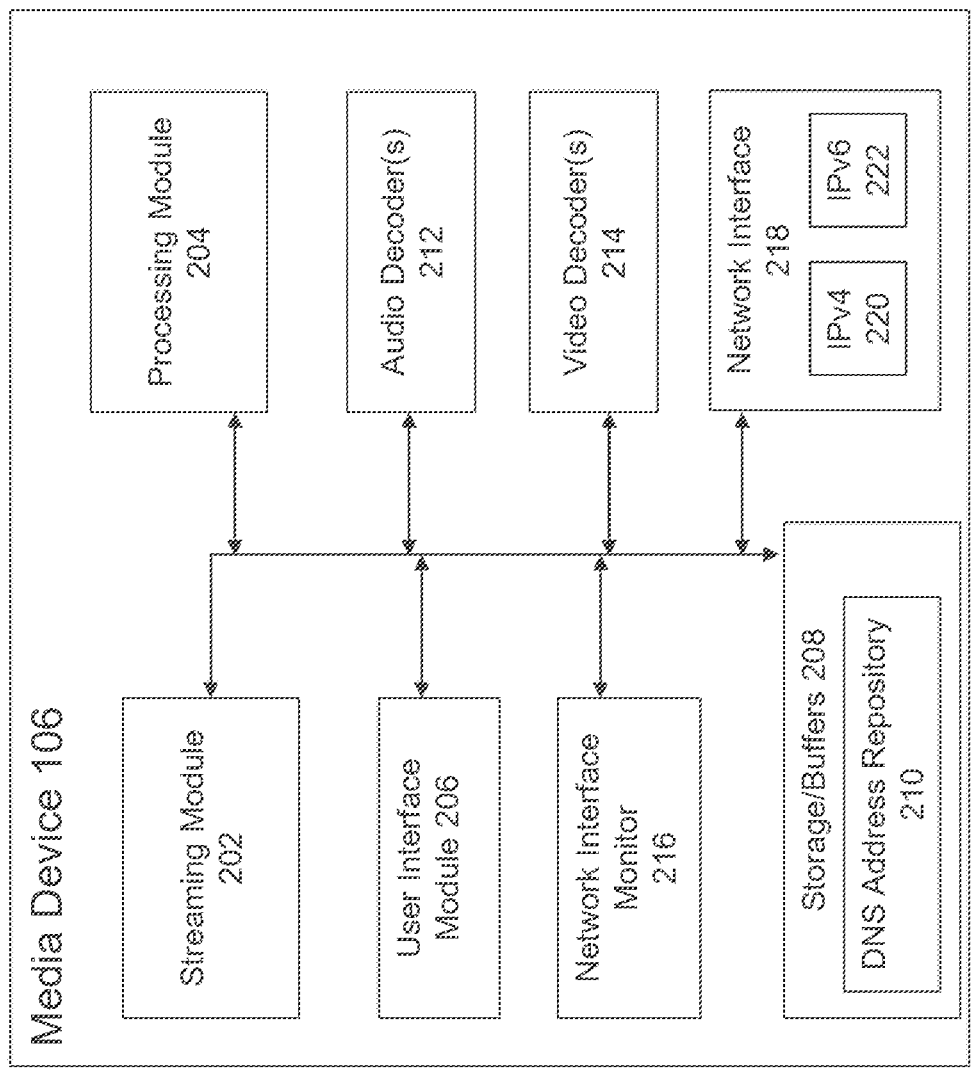
FIG. 2 illustrates a block diagram of a media device, according to some embodiments.

FIG. 2 illustrates a block diagram of an example media device 106, according to some embodiments. Media device 106 may include a streaming module 202, processing module 204, storage 208, and user interface module 206.

In streaming embodiments, the streaming module 202 may transmit the content to the display device 106 in real time or near real time as it receives such content from the content server(s) 120. In non-streaming embodiments, the media device 106 may store the content received from content server(s) 120 in storage 208 for later playback on display device 106.

The media device 106 may also include one or more audio decoders 212 and one or more video decoders 214. Each audio decoder may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4 a, m4 b, m4 r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

In some embodiments, video decoder 214 may be implemented as one or more of a hardware decoder and a software decoder. Hardware decoder may be implemented as a dedicated hardware component, such as a graphics processing unit. Software decoder may be a combination of software that controls processing module 204 to perform video decoding. In some embodiments, processing module 204 may offload certain operations of the launch sequence to the video decoder 214 as needed. For example, processing module 204 may direct video decoder 214 to process and display the dynamic splash screen while processing module 204 compiles start-up code for launching the application. In some embodiments, processing module 204 and video decoder 214 may operate in parallel.

Media device 106 may further include network interface monitor 216 and network interface 218, which may comprise an IPv4 network stack 220 and an IPv6 network stack 222. Network interface 218 may communicate using assigned IPv6 address information over the IPv6 network stack 222 and assigned IPv4 address information over the IPv4 network stack 220.

Network interface monitor 216 may be implemented to monitor network address changes to network interface 218, such as assignment of any new IPv4 or IPv6 endpoint addresses and removal of any assigned IPv4 or IPv6 endpoint addresses. Network interface monitor 216 may be configured to trigger connectivity tests based on any detected IPv6 endpoint address changes to network interface 218. Network interface monitor 216 may be further configured to manage DNS address repository 210, as discussed further below.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 130. The content server(s) 120 may transmit the requested content to the streaming module 202. The media device 106 may transmit the received content to the display device 106 for playback to the user 132. The media device 106 may store content received from content server 120 in storage 208.

Storage 208 may further include a DNS address repository 210. In some embodiments, DNS address repository 210 may be configured to be accessible only by specific components of media device 106 such as network interface monitor 216 and may be configured to prevent unauthorized components from accessing any data within DNS address repository 210. DNS address repository 210 may further be configured to store IPv6 DNS server addresses. Network interface monitor 216 may be further authorized to manage the IPv6 DNS addresses within the DNS address repository 210 based on the results of a DNS resolver test on the DNS addresses. Examples of management of DNS addresses in the DNS address repository 210 include prioritizing DNS addresses, removing DNS addresses, and maintaining DNS addresses. In some embodiments, media device 106 may authorize only certain components to access the DNS address repository 210.

Figure 3:
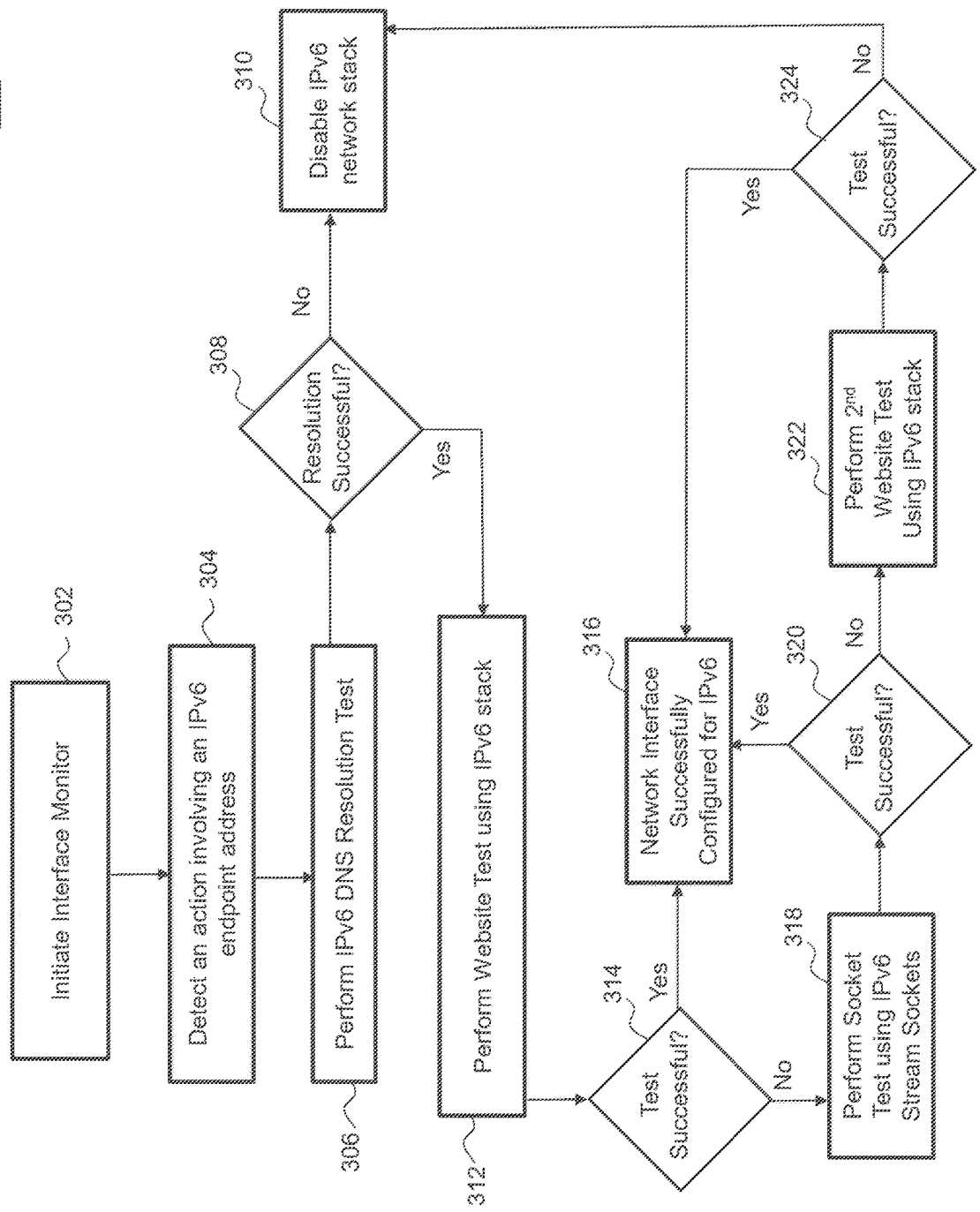
FIG. 3 illustrates a flowchart including steps of an IPv6 connectivity test, according to some embodiments.

Embodiments of Performing IPv6 Connectivity Tests Including IPv6 Address Check and DNS Resolver Test FIG. 3 illustrates a flowchart for an IPv6 connectivity test 300 illustrating performing an IPv6 DNS resolution test and an IPv6 website test at a media device, according to some embodiments. As a non-limiting example with regards to FIGS. 1-2, one or more processes described with respect to FIG. 3 may be performed by a media device (e.g., media device 106 of FIG. 1) or a display device (e.g., display device 104 of FIG. 1). In such an embodiment, any of these components may execute code in memory to perform certain steps of IPv6 connectivity test 300 of FIG. 3. While IPv6 connectivity test of FIG. 3 will be discussed below as being performed by media device 106, other devices may store the code and therefore may execute IPv6 connectivity test 300 by directly executing the code. Accordingly, the following discussion of IPv6 connectivity test 300 will refer to devices of FIG. 2 as an exemplary non-limiting embodiment of IPv6 connectivity test 300. Moreover, it is to be appreciated that not all steps may be needed to perform the disclosure provided herein. Further, some of the steps may be performed simultaneously or in a different order than shown in FIG. 3, as will be understood by a person of ordinary skill in the art.

In 302, media device 106 initiates a network interface monitor, such as network interface monitor 216. The network interface monitor may be configured to monitor any IPv6 endpoint address changes. In some embodiments, media device 106 may initiate the network interface monitor when the media device 106 obtains an IPv4 endpoint address.

In 304, the network interface monitor may detect an action involving an IPv6 address taking place at the network interface of media device 106. The network interface monitor may initiate an IPv6 address test based on the detected action.

Steps 306-324 may represent steps or sub-tests of the IPv6 connectivity test that are performed on each IPv6 address that is assigned to the network interface of the media device 106 and on each IPv6 DNS server addresses that are stored the private memory location of the media device 106. The network interface comprises an IPv6 stack for communicating using IPv6 network addresses and an IPv4 stack for communicating using IPv4 network addresses. In some embodiments, steps 306-324 may be triggered based on the action involving the IPv6 address. Examples of the action include assigning the IPv6 address to the network interface of the media device 106, removing the IPv6 address from the network interface, or updating an existing IPv6 address already assigned to the network interface. Upon detecting the action, network interface monitor may initiate the IPv6 address test for each IPv6 address of media device 106 starting with step 306. If any sub-test of the IPv6 address test fails, then network interface monitor may disable the IPv6 stack and cause media device 106 to communicate using the IPv4 stack.

In some embodiments, the sub-tests may be triggered preemptively such as prior to receiving a request to stream content. Accordingly, the sub-tests increase the likelihood of establishing reliable IPv6 connections when the media device 106 subsequently receives requests to stream content.

In 306, network interface monitor may perform an IPv6 DNS resolution test on each IPv6 DNS server address that is stored in the private memory location of the media device 106. In some embodiments, the IPv6 DNS resolution test may include identifying, by the network interface monitor, the set of IPv6 DNS server addresses and a predetermined website stored at media device 106, such as in storage/buffers 208. The network interface monitor may then attempt to resolve a predetermined website using each IPv6 DNS server address in the set of IPv6 DNS server addresses.

In 308, network interface monitor may determine the results of the IPv6 DNS resolution test that is performed for each IPv6 DNS server address. The results may indicate a successful result or a failed result of the resolution test. For example, a successful result may indicate that the media device was able to successful resolve the predetermined website using the IPv6 DNS server address; a failed result may indicate that the media device 106 was not able to perform the resolution with the IPv6 DNS server address. In some embodiments, there may be multiple DNS server addresses stored in the private memory location and not every IPv6 DNS server address may provide a successful result to the resolution test. The network interface monitor may collect the results from each IPv6 DNS resolution test.

In 310, if the IPv6 DNS resolution test is unsuccessful for every IPv6 DNS server address, then network interface monitor may disable the IPv6 network stack of the network interface of media device 106 and prevent the media device 106 from communicating using IPv6. Accordingly, disabling the IPv6 network stack causes media device 106 to communicate data, such as streaming content, over the IPv4 network stack.

In 312, if the IPv6 DNS resolution test is successful for at least one IPv6 address, then network interface monitor may continue with an IPv6 website test using the IPv6 network stack of the media device 106. In some embodiments, the IPv6 website test may include attempting to download a webpage from the predetermined website using the IPv6 network stack. In some embodiments, network interface monitor may set an internal flag to force all communications from the media device 106 to be transmitted only using the IPv6 network stack, including attempts to download a webpage from the predetermined website. In some embodiments, IPv6 DNS resolution test is performed for every IPv6 address that is assigned to media device 106.

In 314, the network interface monitor may determine the result of the IPv6 website test. The result may indicate a successful result or a failed result of the IP website test. For example, a successful result may indicate that the media device 106 was able to successfully download a webpage from the predetermined website over the IPv6 network stack, which may indicate, for example, that the media device 106 was able to successfully use an assigned IPv6 endpoint address to communicate with the predetermined website. A failed result may indicate that the media device 106 was not able to perform the download over the IPv6 network stack.

In 316, if the IPv6 website test is successful, then the network interface monitor may determine that the IPv6 connectivity test is successful, e.g., that the network interface is properly configured with IPv6 parameters (e.g., IPv6 endpoint addresses and IPv6 DNS server addresses). The media device 106 may then communicate over the IPv6 network stack.

In 318, if the IPv6 website test is not successful, then the IPv6 connectivity test moves to performing the next sub-test, the IPv6 socket test. In some embodiments, the IPv6 socket test comprises opening at least one IPv6 streaming socket of the media device and attempting to communicate data using the at least one IPv6 streaming socket of the media device.

In 320, the network internet monitor may determine the result of the IPv6 socket test. The result may indicate a successful result or a failed result of the IPv6 socket test. For example, a successful result may indicate that at least one IPv6 socket was successfully opened and received and/or transmitted data from that opened socket. If the IPv6 socket test returns a successful result, then the network interface monitor may determine that the IPv6 connectivity test is successful and that the media device 106 may communicate over the IPv6 network stack. A failed result may indicate that the IPv6 no IPv6 sockets were successfully opened.

In 322, if the IPv6 socket test is not successful, then the IPv6 connectivity test moves to performing the next sub-test, a second IPv6 website test using the IPv6 stack. In some embodiments, the second IPv6 website test may include attempting to connect to a second predetermined website using the IPv6 network stack. The second predetermined website may be stored in a memory of the media device 106, such as storage/buffers 208. In some embodiments, media device 106 may include a remote configuration service to allow the second predetermined website to be remotely updated. For example, a remote server may utilize the remote configuration service to access the memory of the media device 106 to change the second predetermined website.

In 324, the network interface monitor may determine the result of the second IPv6 website test. The result may indicate a successful result or a failed result of the second IP website test. For example, similar to the first IPv6 website test, a successful result may indicate that the media device 106 was able to successfully connect to the second predetermined website over the IPv6 network stack. A failed result may indicate that the media device 106 was not able to connect to the second website.

If the second IPv6 website test is successful, then the network interface monitor may determine that the IPv6 connectivity test is successful and that the network interface of the media device 106 may communicate properly over the IPv6 network stack at 316. If the second IPv6 website test is not successful, then the network interface monitor may determine that the network interface cannot communicate properly using IPv6 and disables the IPv6 network stack. All subsequent network communications may then be transmitted over the IPv4 network stack.

In some embodiments, not all sub-tests of the IPv6 connectivity test need to be performed or in the specific order described with respect to FIG. 3.

Figure 4:
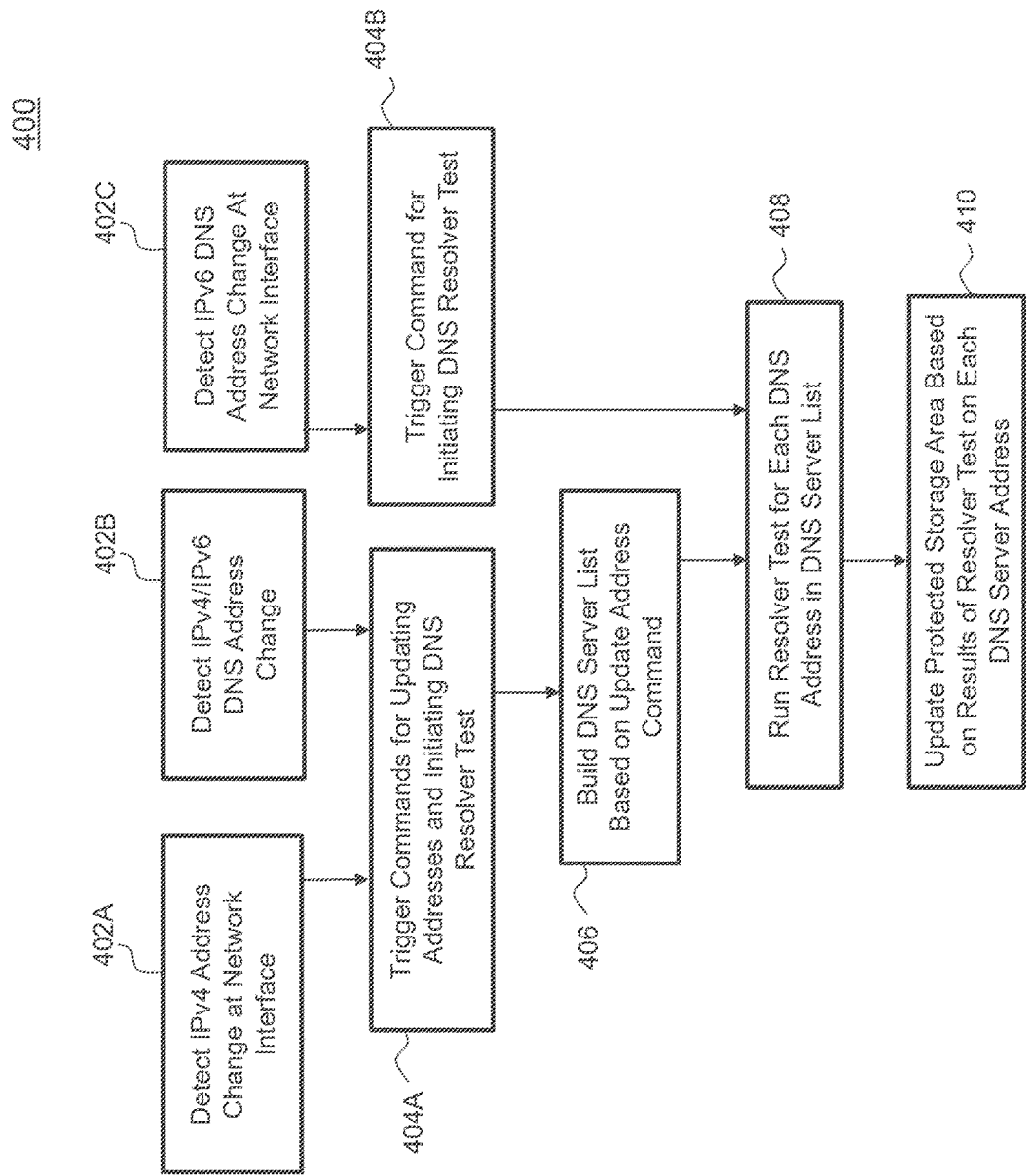
FIG. 4 illustrates a flowchart including steps of a DNS resolver test, according to some embodiments.

FIG. 4 is a diagram of a DNS resolver test 400 illustrating a time sequence functions performed different components a media device, according to some embodiments. As a non-limiting example about FIGS. 1-2, one or more functions described with respect to FIG. 4 may be performed by a media device (e.g., media device 106 of FIG. 1) or a display device (e.g., display device 104 of FIG. 1). In such an embodiment, any of these components may execute code in memory to perform certain steps of DNS resolver test 400 of FIG. 4. While DNS resolver test 400 of FIG. 4 will be discussed below as being performed by certain components of media system 102, other components may store the code and therefore may execute DNS resolver test 400 by directly executing the code. Accordingly, the following discussion of DNS resolver test 400 will refer to devices of FIG. 2 as an exemplary non-limiting embodiment. Moreover, it is to be appreciated that not all steps may be needed to perform the disclosure provided herein. Further, some of the functions may be performed simultaneously, in a different order, or by the same components than shown in FIG. 4, as will be understood by a person of ordinary skill in the art.

In 402A-C, a network manager component of media device 106 may detect a trigger condition for initiating the DNS resolver test. In some embodiments, the DNS resolver test evaluates each IPv4 and IPv6 DNS addresses stored in the DNS address repository 210 of media device 106. As noted above, DNS address repository 210 may be configured to be managed only by authorized components of media device 106. An example of an authorized component may include a DNS configuration module, which can be authorized to manage the DNS addresses in the DNS address repository 210. In some embodiments, media device 106 may prevent any other component from being authorized to access the DNS address repository in order maintain the sanctity of the repository. Either one of the trigger conditions may trigger a command to be sent to initiate the DNS resolver test for testing the DNS addresses.

In 402A, the network manager may detect a change to an IPv4 address assigned to the network interface 218 of media device 106. Examples of a change include assignment of a new IPv4 address, removal of a previously assigned IPv4 address, and updating of an existing IPv4 address assigned to the network interface 218.

In 402B, the network manager may detect a change to a DNS address of a DNS address stored in DNS address repository 210. Examples of a change to a DNS address include assignment of a new DNS (IPv4 or IPv6) server address, removal of a previously stored DNS server address, or update of the DNS server address.

In 402C, the network manager may detect a change to an IPv6 address signed to the network interface 218 of media device 106. Examples of a change include assignment of a new IPv6 address, removal of a previously assigned IPv6 address, and updating of an existing IPv6 address assigned to the network interface 218.

In 404A, either detection of an IPv4 address change (step 402A) or a DNS address change (step 402B) triggers the network manager to transmit commands to the DNS configuration module. One command may be an update address command, which causes the DNS configuration module to update the IPv4 and IPv6 addresses at the media device 106. Another command may be a DNS resolver command to initiate a DNS resolver test to test the DNS addresses currently stored in DNS address repository 210.

In 404B, detection of the IPv6 address change (step 402C) triggers the network manager to transmit only the DNS resolver command to initiate the DNS resolver test. The detection of the IPv6 address change operates differently from the IPv4 address change because, in the case of the IPv4 address change, the DHCP packet itself brings the DNS server address to the media device.

In 406, the DNS configuration module will build the DNS server list based on the DNS server address provided in the DHCP packet of the IPv4 address change or the new DNS server address. For example, when an IPv4 address is changed, the DNS configuration module will update the DNS server list based on DNS server address included in the DHCP packet that included any changes to the IPv4 address, such as assignment of the IPv4 address to the media device 106. In some embodiments, the DNS server list is a temporary file that is separate from the DNS address repository 210. The DNS server list may include all DNS server addresses to be tested and any DNS servers that pass that the resolver test (step 408) may be added to the DNS address repository 210.

In some embodiments, the DNS configuration module may populate the DNS server list only with the new DNS server addresses provided as part of the IPv4 address change or the DNS server address change. In some embodiments, the DNS configuration module may populate the DNS server list with the new DNS server addresses in addition to the DNS server addresses stored in the DNS server repository. In the former embodiment, the DNS resolver test (step 408) may be performed on the new DNS server addresses only. In the latter embodiment, the DNS resolver test may be performed on the new DNS server addresses while also retesting previously stored DNS server addresses to check that they are still functioning properly.

In 408, the DNS configuration module initiates the DNS resolver test for each DNS server address in the DNS server list. The DNS configuration module may receive the results of the DNS resolver test and determine, for each tested DNS server address, a failed or successful result. In some embodiments, a successful result of the DNS resolver test is receiving a response from the identified DNS server within a predetermined time period, such as 2 seconds. The DNS configuration module may configure this predetermined time period based on commands received from a remote device, such as system server 140. For example, system server 140 may adjust the predetermined time period based on crowdsource information received from one or more other media device(s) that are in communication with system server 140. In some embodiments, system server 140 may push an update to the one or more media devices 106 that modifies one or more configuration parameters including the predetermined time period for the DNS configuration module to wait for a response from the DNS server in the DNS resolver test.

In some embodiments, the DNS configuration module may perform the DNS resolver test in parallel for each DNS server address in the DNS server list. For example, if there are five DNS server addresses in the server list, DNS configuration module attempts to resolve a domain name in parallel with each address.

In such embodiments, parallel DNS queries may be initiated by a background process in media device 106. The background process may be configured to the DNS resolver test may include initiating parallel DNS queries. The background process may coordinate with applications installed on the media device to initiate queries to the DNS servers that may be available to media device 106. The applications may retrieve DNS addresses from the private local memory of media device 106 and generate DNS queries based on the retrieved DNS addresses. Separately, the background process may also poll a separate DNS server file that is located upstream in the network from the media device to retrieve DNS servers. When the background process receives the DNS queries from the applications, the background process may then check a cache, also on media device 106 and which stores prior DNS responses to prior DNS queries, to see if a prior DNS response has been received from any of the DNS servers identified in the received DNS queries. If no such DNS responses are in the cache, then the background process will send parallel queries to all DNS servers (identified by their server IP addresses), and subsequently cache any responses received to the parallel queries In some embodiments, the DNS configuration module may distinguish between IPv6 DNS server addresses and IPv4 DNS server addresses when performing the DNS resolver test. For example, if the DNS configuration module detects a change to an IPv4 address at the network interface 218 of the media device 106, then DNS configuration module may only initiate the DNS resolver test for IPv4 DNS server addresses (and exclude the IPv6 DNS server addresses). Similarly, if the DNS configuration module detects a change to an IPv6 address, then the DNS configuration module may only initiate the DNS resolver test for IPv6 DNS server addresses.

In 410, the DNS configuration module updates the DNS address repository 210 based on the results of the resolver test for each DNS server address. In some embodiments, a failed DNS resolver test for a DNS server addresses causes the DNS configuration module to remove the DNS server address from the DNS address repository 210; for a successful DNS resolver test, the DNS configuration module maintains the DNS server address in the DNS address repository.

Example Computer System

Figure 5:
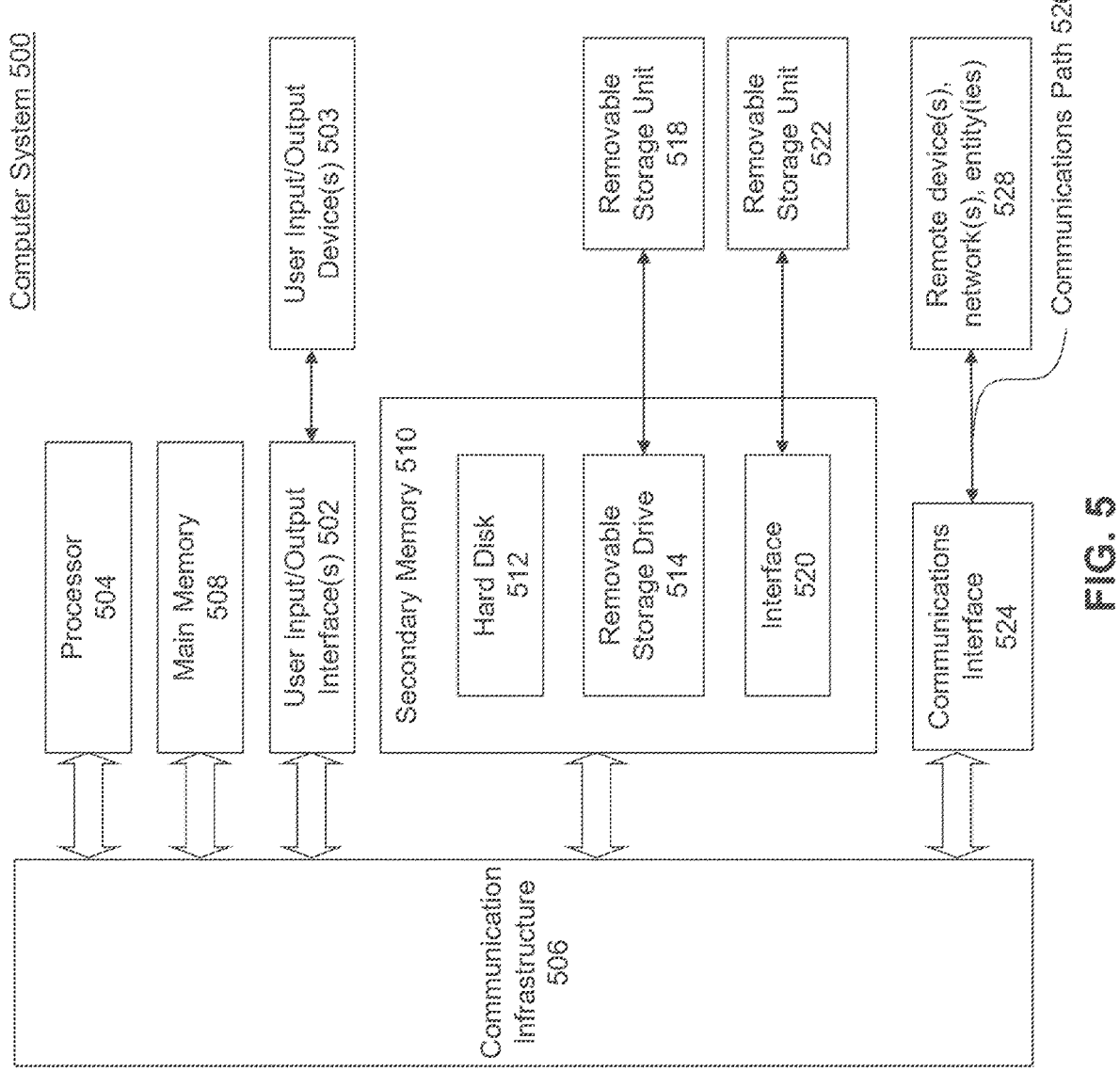
FIG. 5 illustrates an example computer system useful for implementing various embodiments.

Various embodiments may be implemented, for example, using one or more well-known computer systems, such as computer system 500 shown in FIG. 5. For example, the media device 106 may be implemented using combinations or sub-combinations of computer system 500. Also or alternatively, one or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500 or processor(s) 504), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
    initiating an Internet Protocol Version 6 (IPv6) address test on a media device comprising a network interface configured with an IPv6 network stack and an Internet Protocol Version 4 (IPv4) network stack, wherein the IPv6 address test comprises:
        identifying, by a network interface monitor, a set of IPv6 server addresses stored in a private memory of the media device;
        identifying, by the network interface monitor, a predetermined website stored in a memory of the media device;
        performing, by the network interface monitor, an IPv6 address resolution test of the predetermined website for each IPv6 server address in the set of IPv6 server addresses;
        responsive to a result of the IPv6 address resolution test indicating a failed result for each IPv6 server address:
            disabling the IPv6 network stack, wherein the media device streams data using the network interface over the IPv4 network stack; and
        responsive to the result of the IPv6 address resolution test indicating a successful result for at least one IPv6 server address:
            performing a connectivity test to the predetermined website, wherein the media device streams the data using the network interface over the IPv6 network stack or the IPv4 network stack based on a second result of the connectivity test;
            responsive to the second result indicating a successful result of the connectivity test, streaming the data using the network interface over the IPv6 network stack;
            responsive to the second result indicating a failed result of the connectivity test, performing an IPv6 streaming sockets test; and
            streaming the data using the network interface over the IPv6 network stack responsive to a third result of the IPv6 streaming sockets test indicating a successful result of the IPv6 streaming sockets test.

2. The method of claim 1, wherein the connectivity test comprises attempting to download a webpage from the predetermined website using the IPv6 network stack.

3. The method of claim 1, wherein the initiating the IPv6 address test is performed in response to detecting, by the network interface monitor, an action involving an IPv6 endpoint address, wherein the action is performed on a network interface of the media device.

4. The method of claim 3, wherein the action comprises one of assigning the IPv6 endpoint address to the network interface of the media device or removing the IPv6 endpoint address from the network interface of the media device.

5. The method of claim 1, wherein the IPv6 streaming sockets test comprises:
    opening at least one IPv6 streaming socket of the media device; and
    attempting to communicate using the at least one IPv6 streaming socket of the media device.

6. The method of claim 1, further comprising:
    responsive to the third result of the IPv6 streaming sockets test indicating a failed result of the IPv6 streaming sockets test, performing a second connectivity test with a second predetermined website using the IPv6 network stack of the media device; and
    responsive to a fourth result of the second connectivity test indicating a successful result of the second connectivity test, streaming the data using the network interface over the IPv6 network stack.

7. The method of claim 6, further comprising:
    responsive to the fourth result of the second connectivity test indicating a failed result, disabling the IPv6 network stack; and
    streaming, by the media device, the data using the network interface over the IPv4 network stack.

8. The method of claim 6, wherein the second connectivity test comprises attempting to connect to the second predetermined website over the IPv6 network stack.

9. A media device, comprising: at least one processor configured to perform operations comprising:
    initiating an Internet Protocol Version 6 (IPv6) address test on the media device comprising an IPv6 network stack and an Internet Protocol Version 4 (IPv4) network stack, wherein the IPv6 address test comprises:
        identifying a set of IPv6 server addresses stored in a private memory of the media device;
        identifying a predetermined website stored in a memory of the media device;
        performing an IPv6 address resolution test of the predetermined website for each IPv6 server address in the set of IPv6 server addresses;
        responsive to a result of the IPv6 address resolution test indicating a failed result for each IPv6 server address:
            disabling the IPv6 network stack; and
            streaming data using the network interface over the IPv4 network stack;
        responsive to the result of the IPv6 address resolution test indicating a successful result for at least one IPv6 server address:
            performing a connectivity test to the predetermined website; and
            streaming the data using the network interface over the IPv6 network stack or the IPv4 network stack based on a second result of the connectivity test;
            responsive to the second result indicating a successful result of the connectivity test, streaming the data using the network interface over the IPv6 network stack;
            responsive to the second result indicating a failed result of the connectivity test, performing an IPv6 streaming sockets test; and
            streaming the data using the network interface over the IPv6 network stack responsive to a third result of the IPv6 streaming sockets test indicating a successful result of the IPv6 streaming sockets test.

10. The media device of claim 9, wherein the connectivity test comprises attempting to download a webpage from the predetermined website using the IPv6 network stack.

11. The media device of claim 9, wherein the initiating the IPv6 address test is performed in response to detecting, by the network interface monitor, an action involving an IPv6 endpoint address, wherein the action is performed on a network interface of the media device.

12. The media device of claim 11, wherein the action comprises one of assigning the IPv6 endpoint address to the network interface of the media device or removing the IPv6 endpoint address from the network interface of the media device.

13. The media device of claim 9, wherein the IPv6 streaming sockets test comprises:
opening at least one IPv6 streaming socket of the media device; and
attempting to communicate using the at least one IPv6 streaming socket of the media device.

14. The media device of claim 9, the operations further comprising:
responsive to the third result of the IPv6 streaming sockets test indicating a failed result of the IPv6 streaming sockets test, performing a second connectivity test with a second predetermined website using the IPv6 network stack of the media device; and
responsive to a fourth result of the second connectivity test indicating a successful result of the second connectivity test, streaming the data using the network interface over the IPv6 network stack.

15. The media device of claim 14, the operations further comprising:
responsive to the fourth result of the second connectivity test indicating a failed result, disabling the IPv6 network stack; and
streaming, by the media device, the data using the network interface over the IPv4 network stack.

16. The media device of claim 15, wherein the second connectivity test comprises attempting to connect to the second predetermined website over the IPv6 network stack.

17. A non-transitory computer-readable medium having instructions stored thereon that, when executed by at least one computing device, cause the at least one computing device to perform operations comprising:
Initiating an Internet Protocol Version 6 (IPv6) address test on a media device comprising a network interface configured with an IPv6 network stack and an Internet Protocol Version 4 (IPv4) network stack, wherein the IPv6 address test comprises:
identifying, by a network interface monitor, a set of IPv6 server addresses stored in a private memory of the media device;
identifying, by the network interface monitor, a predetermined website stored in a memory of the media device;
performing, by the network interface monitor, an IPv6 address resolution test of the predetermined website for each IPv6 server address in the set of IPv6 server addresses;
responsive to a result of the IPv6 address resolution test indicating a failed result for each IPv6 server address:
disabling the IPv6 network stack, wherein the media device streams data using the network interface over the IPv4 network stack; and responsive to the result of the IPv6 address resolution test indicating a successful result for at least one IPv6 server address:
performing a connectivity test to the predetermined website, wherein the media device streams the data using the network interface over the IPv6 network stack or the IPv4 network stack based on a second result of the connectivity test;
responsive to the second result indicating a successful result of the connectivity test, streaming the data using the network interface over the IPv6 network stack;
responsive to the second result indicating a failed result of the connectivity test, performing an IPv6 streaming sockets test; and
streaming the data using the network interface over the IPv6 network stack responsive to a third result of the IPv6 streaming sockets test indicating a successful result of the IPv6 streaming sockets test.

18. The non-transitory computer-readable medium of claim 17, wherein the connectivity test comprises attempting to download a webpage from the predetermined website using the IPv6 network stack.

* * * * *